United States Patent [19] [11] 3,763,830
Robinson et al. [45] Oct. 9, 1973

[54] APPARATUS FOR BURNING SULFUR CONTAINING FUELS
[75] Inventors: Ernest B. Robinson, Silver Spring; Shelton Ehrlich, Bowie, both of Md.; John W. Bishop, Alexandria, Va.
[73] Assignee: The United States of America as represented by the Secretary of the Interior
[22] Filed: Jan. 24, 1973
[21] Appl. No.: 315,445

Related U.S. Application Data
[62] Division of Ser. No. 66,724, Aug. 25, 1970.

[52] U.S. Cl. .............................. 122/4 D, 110/28 J
[51] Int. Cl. ............................................. F22b 1/02
[58] Field of Search ...................... 122/4 D; 110/28 J

[56] References Cited
UNITED STATES PATENTS
2,842,102 7/1958 Blaskowski ............................ 122/4
3,387,590 6/1968 Bishop .................................... 122/4
3,495,654 2/1970 Jacubowiez ............................ 122/4
3,508,506 4/1970 Bishop .................................... 122/4

Primary Examiner—Kenneth W. Sprague
Attorney—Frank A. Lukasik et al.

[57] ABSTRACT

Combustion apparatus for the removal of sulfur oxides from fuels containing sulfur. A first and a second fluidized bed boiler having heat exchange surfaces, that burn the sulfur fuels are positioned adjacent each other with the second bed having less heat exchange surface than the first. Each bed has solid particulate sulfur acceptors that are circulated between the two beds. Heat exchange wall members between the beds semi-isolate them from each other such that there is little or no mixing of the gaseous combustion products from each boiler. The circulation between beds may be accomplished by ports in the exchange wall below the top of the fluidized beds. The end result is the gas emitted to the atmosphere from the beds after additional processing is depleted in sulfur oxides.

5 Claims, 4 Drawing Figures

APPARATUS FOR BURNING SULFUR CONTAINING FUELS

This application is a division of patent application having U.S. Pat. Ser. No. 66,724 filed Aug. 25, 1970, now U.S. Pat. No. 3,717,700.

This invention arose under a project sponsored by the National Air Pollution Control Administration of the U. S. Department of Health, Education, and Welfare. The project was conducted under contract with the Office of Coal Research of the U. S. Department of the Interior through an interagency transfer of funds from the National Air Pollution Control Administration.

BACKGROUND OF THE INVENTION

There is an increasing public and governmental interest in curbing sulfur oxide pollution of the atmosphere. Many localities have now enacted legislation severely restricting sulfur dioxide omissions in the products of combustion or the sulfur content of fuel burned. These restrictions are having a major disruptive effect upon traditional combustion methods and fuel sources.

Much of the sulfur dioxide emitted to the atmosphere is produced by the burning of coal, particularly in power generation. Some authorities estimate that as high as 60 percent of the total sulfur dioxide pollution is caused by burning of coal. Historically in the United States, removal of sulfur dioxide has been practiced only with smelter gases where concentrations normally range from about 3 to 7 percent. Removal of sulfur oxides from power plant stack gases is much more difficult because of the vastly greater gas flows and smaller sulfur oxide concentrations. Concentration of sulfur oxides in power plant stack gases generally ranges from about 0.2 to 0.5 percent; a fuel containing 5 percent sulfur, for example, when burned in a conventional boiler produces a flue gas containing about 0.5 percent sulfur oxides.

Removal of sulfur oxides from a gas stream is an old art. An excellent compendium of this art will be found in the U. S. Bureau of Mines Information Circular 7836 (1958). Since that time, major research emphasis has been placed by the National Air Pollution Control Administration upon the development of improved absorbents for sulfur oxide removal. A description of the current state-of-the-art may be obtained from NAPCA publication AP-52, Control Techniques for Sulfur Oxide Air Pollutants.

Some prior art methods make use of limestone-based materials. In one process, finely divided limestone is injected into a boiler furnace at a point somewhat removed from the flame where the limestone calcines and partially reacts with sulfur oxides. The partially reacted solid is then removed from the flue gas by dry methods and is either wasted or sent to a regenerator.

In another process, finely divided limestone is again injected into a boiler furnace but the partially reacted solid is passed to a gas scrubber where it reacts with sulfur oxides as they pass into solution. A variation of this process passes the limestone product limestone derived material directly into the gas scrubber without first having been injected into the furnace.

A third method uses particulate limestone as a fixed, moving or fluidized bed at temperatures in the range of about 1,200° to about 1,800° F to contact and absorb sulfur oxides in a flue gas stream. The resulting product may either be wasted or regenerated to drive off and recover sulfur oxides.

Finally, it has been proposed to burn sulfur-bearing coal or oil in a fluidized bed of limestone. Combustion in a fluidized bed may be carried out at relatively low temperatures so that the calcined limestone retains its activity toward sulfur oxides. If fuel is burned within such a fluidized limestone bed under reducing conditions, then sulfur oxides are fixed as the sulfide; if burned under generally oxidizing conditions they are fixed as the sulfate. It has been proposed to roast sulfides with air in a separate regenerator to produce sulfur dioxide and to obtain calcium oxide for reuse in the system. It has also been proposed to react calcium sulfates under reducing conditions to obtain the same products.

Specific processes taught in the prior art for regenerating sulfated calcium oxides include reduction by partial combustion of carbon monoxide at about 1,850° F; reduction by partial combustion of methane at approximately 2,000° F; and reduction by partial combustion of fuel oil at about 1,850° F. None of these processes for decomposing sulfated calcium oxides can be carried out in a boiler furnace since the reducing gases carburize boiler tubes thus weakening them and causing eventual failure. From a practical viewpoint, use of reducing conditions requires a separate regenerator.

SUMMARY OF THE INVENTION

We have found that sulfur oxide acceptors, such as calcined limestone, dolomite and the like, can be regenerated or forced to release sulfur dioxide within a fluidized bed combustion furnace operating in an oxidizing mode. Thus, regeneration of a sulfur oxide acceptor can be carried out simultaneously with combustion and steam generation.

In our most preferred embodiment, coal is burned within a plurality of fluidized bed combustion zones in contact with sulfur oxide acceptor. Noncombustible particulate material comprising the sulfur oxide acceptor freely circulates between these combustion zones and a regeneration zone while flue gas issuing from the combustion zones is segregated from that produced in the regeneration zone. The regeneration zone is operated at a higher temperature than are the combustion zones. Sulfur oxides absorbed in the combustion zones is released as sulfur dioxide in the higher temperature regeneration zone. As a result, flue gas issuing from the combustion zones is substantially depleted in sulfur oxides while flue gas exhausting from the regeneration zone is substantially enriched in sulfur dioxide.

Hence it is an object of our invention to provide apparatus to reduce atmospheric omissions of sulfur oxides from combustion of sulfur-containing fuels.

It is another object of our invention to concentrate a major portion of sulfur oxides produced in a boiler furnace within a small portion of flue gas.

Another object of our invention is to provide an apparatus for regenerating sulfur oxide acceptor materials.

DETAILED DESCRIPTION OF THE INVENTION

Figure 1:
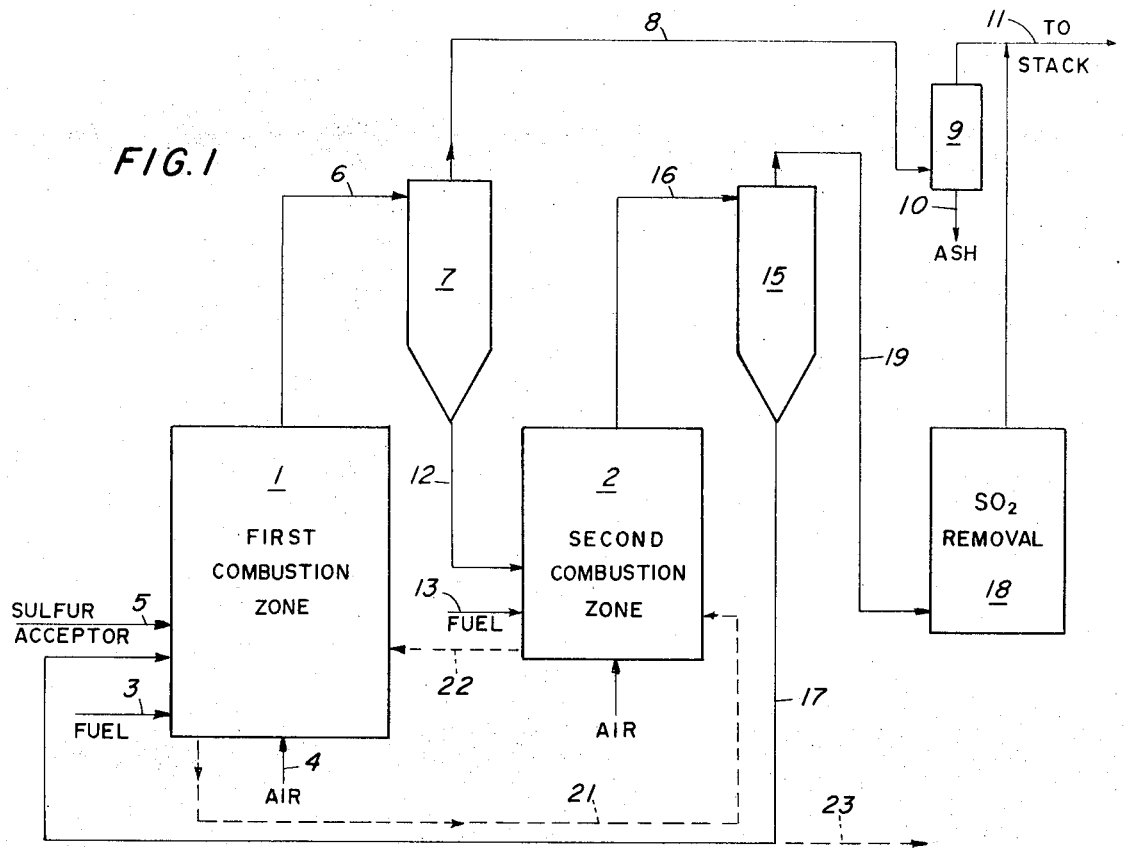

When coal or other sulfur containing fuels are burned in a fluidized bed of limestone, three identifiable reactions can proceed simultaneously. First, combustion of the fuel occurs with releases of water vapor, carbon oxides and sulfur oxides depending upon fuel composition. Calcining of the limestone also takes place to produce a calcium oxide or lime which then can react with an absorb sulfur oxides.

There is a particular temperature range at which all three reactions proceed at suitable rates and efficiencies. Burning of coal and similar fuels in a fluidized bed requires a minimum temperature of about 1,400° F. Below this temperature, combustion is unstable and tends to be incomplete. Complete combustion is defined for the purposes of this disclosure as the essentially complete oxidation of fuel gases, i.e., carbon monoxide, hydrocarbons and hydrogen. It does not imply complete combustion of carbon particles leaving the combustor since these may be conveniently removed from the products of combustion and re-fired. That same temperature, 1,400° F, has been found too low for rapid calcination of carbonates such as limestone in a fluidized bed combustor. However, calcium carbonate calcines easily at temperatures of about 1,500° F and higher. Sulfur oxides are also readily accepted by calcined limestones, dolomites and the like at that same temperature, 1,500° F, but their reactivity towards the sulfur oxides declines with increasing temperature reaching essentially zero above about 2,000° F. There is, however, a temperature range between about 1,450° and 1,750° F in which all three reactions will proceed simultaneously at acceptable rates. Overall efficiency of the combined reactions increases toward the middle of that temperature range and preferred operating conditions include temperatures between about 1,500° to 1,700° F with about 0.5 to 5 percent unreacted oxygen appearing in the flue gas. Most preferred operating conditions include a temperature range of about 1,550° to 1,650° F and 2–3 percent unreacted oxygen.

Reactions other than combustion which take place within the fluidized bed are as follows:

1. Calcination of calcium carbonate $$CaCO_3 \rightarrow CaO + CO_2$$

This reaction essentially goes to completion at normal operating conditions of the process.

2.

$$CaO + S + 3/2\ O_2 \rightarrow CaSO_4$$

This second reaction is known to be far more complex than the generalized equation presented. For example, it is unknown exactly what form the sulfur is in at the time of reaction. Sulfides and sulfites may be important reaction intermediates but only the sulfate has been found in analyzed samples taken from an operating bed. The reaction proceeds rapidly on the surface of calcined limestone particles and will quickly reach sulfur levels of 7.5 percent or more. A theoretical upper limit of 24 percent sulfur corresponding to anhydrous calcium sulfate, may be approached in some operating conditions.

In the prior art, sulfated calcium oxides, formed in whatever manner, are decomposed in a reducing environment as was previously described. It is at this point that our invention diverges most strongly from the accepted principles of the prior teachings. We decompose the sulfated calcium oxide in accordance with the following generalized reactions.

3.

$$CaSO_4 + CO \rightarrow CaO + SO_2 + CO_2$$

or $$CaSO_4 + H_2 \rightarrow CaO + SO_2 + H_2O$$

Reduction and reducing conditions are indicated by the equations but the reaction is carried out in an oxidizing fluidized bed. Temperature of the reaction must be above about 1,700° F and it is preferred to operate with small but measurable quantities of oxygen appearing in the flue gas. Much higher reaction temperatures, up to about 2,200° F, can be used. At the high temperatures, much higher concentrations of oxygen can be tolerated in the flue gas without interfering with the reaction. We prefer to carry out the decomposition or regeneration step at temperatures within the range of about 1,700° to about 2,100° F with a concentration of unreacted oxygen in the flue gas of less than about 3 percent; specifically within the range of about 0.5 to about 2.5 percent.

Carrying out a reducing reaction within an environment which is generally oxidizing appears at first to be an anomaly. While we do not pretend to completely understand the details of the chemistry involved, we postulate that each burning fuel particle is surrounded by a halo of hot reducing gas. We believe that the actual reaction takes place in a very localized manner within this gas halo before the gas is consumed by the combustion process. At the temperatures utilized in the decomposition or regeneration zone, little or no reaction between the released sulfur dioxide and the regenerated calcium oxide will occur. Hence, essentially complete decomposition of the sulfated calcium oxide can easily be obtained.

Practical techniques and apparatus for utilizing our discovery will be more thoroughly understood by reference to the accompanying drawings in which:

FIG. 1 comprises a generalized, diagrammatic flow sheet of our invention.

Figure 2:
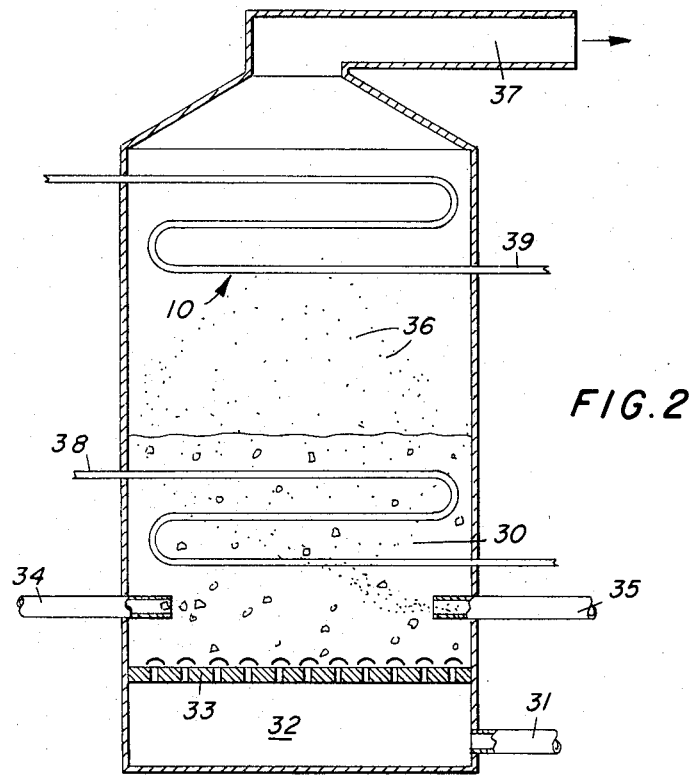

FIG. 2 is a cross-sectional view of a modular fluidized bed boiler useful in the practice of our invention.

Figure 3:
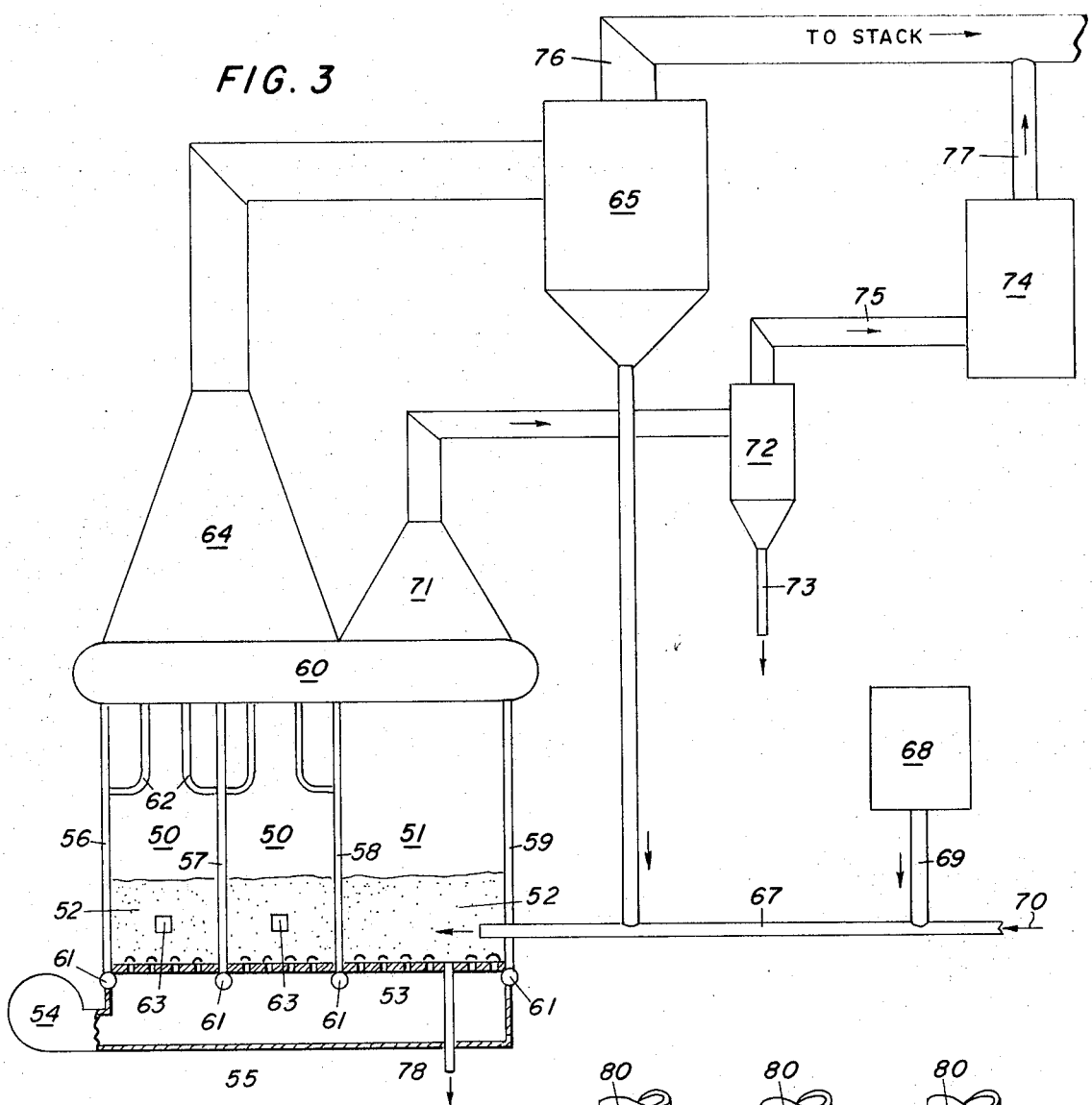

FIG. 3 comprises a partial sectional view of preferred apparatus.

Figure 4:
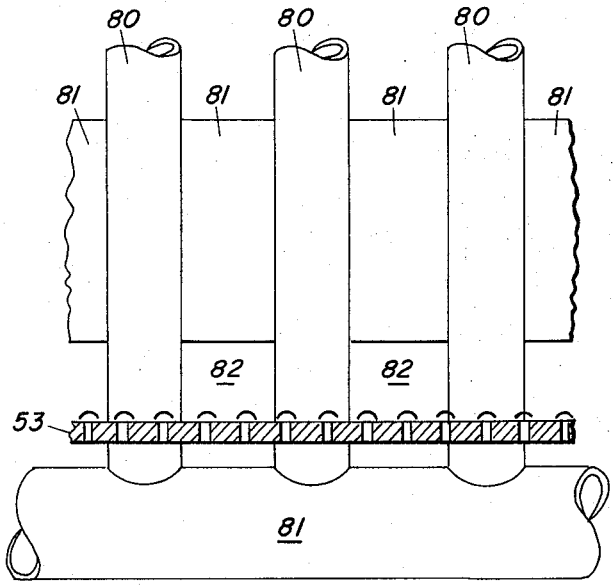

FIG. 4 shows construction details of the heat exchange walls separating modules of our combustion apparatus.

Referring now to FIG. 1, there is shown a generalized, diagrammatic flow sheet of a combustion process utilizing our invention to concentrate sulfur oxides within a minor portion of the total flue gas stream. There is provided a first combustion zone 1 and a second combustion zone 2. Zone 1 may comprise a variety of conventional combustion devices including pulverized coal or oil fired furnaces, fluidized bed combustors and the like. Zone 2 comprises a fluidized bed boiler. For purposes of this disclosure, a fluidized bed boiler is a device which meets each of the following three criteria:

1. Its primary function is to extract heat from a combustion process as by the generation of vapor such as steam.

2. Fuel is added to and is burned within a turbulent bed of particulate material maintained in the fluidized state.

3. A substantial fraction, from about 25 to about 60 percent of the heat released by the combustion is extracted by heat transfer surfaces in direct contact with the fluidized bed.

Devices of this sort are known as the Pope-Bishop boiler and a schematic cross sectional drawing of such a unit adapted for use in our process appears as FIG. 2.

Fuel, such as sulfur-containing coal, is introduced into zone 1 via feed means 3 where it is burned by combustion air entering via means 4. A solid, particulate sulfur acceptor, such as limestone or dolomite is introduced via line 5 into a portion of the combustion zone whereat combustion products are at a temperature in the range of about 1,200° to about 2,500° F. In combustion devices such as pulverized coal furnaces, the sulfur acceptor is introduced in finely divided form at a point somewhat removed from the flame zone and is carried from the combustor in the exiting flue gas stream 6. During the time flue gas is in intimate contact with the sulfur acceptor, some of the sulfur oxides contained within the flue gas are reacted with and absorbed by the acceptor material.

Exit gas stream 6 is then passed to a mechanical separation device 7 which removes substantially all of the sulfated acceptor material along with the larger sized fraction of fly ash produced in the combustion process. This larger sized fraction of fly ash includes most of the unburned or partially burned carbon contained in the flue gas stream. There is recovered from separator 7 a flue gas stream 8 now substantially depleted in entrained solids and sulfur oxides. Stream 8 may then be passed through a secondary solids removal device 9, such as an electrostatic precipitator, where nearly all of the remaining particulate material is removed from the system via line 10. A cleaned flue gas stream 11 is then passed to the stack. Other arrangements of particulate removal devices may also be used.

Solid material recovered from separator 7 and comprising a mixture of sulfated acceptor material, fly ash and unburned carbon is introduced via conduit means 12 into an oxidizing fluidized bed maintained within combustion zone 2. Also introduced into the fluidized bed is supplemental fuel supply 13 which preferably comprises particulate coal. Air stream 14 is provided to supply a slight excess of oxygen over that required for complete combustion, as defined earlier, and to maintain the particulate bed within zone 2 in a fluidized state.

Combustion zone 2 is maintained at a relatively high temperature, preferably in the range of about 1,700° to 2,100° F. In this mode of operation zone 2 performs a function similar to that of the fly ash burnup call disclosed in U. S. Pat. No. 3,508,506. More importantly, however, zone 2 functions to decompose sulfated acceptor material to release sulfur dioxide and regenerate the acceptor to an active form. A product gas stream substantially enriched in sulfur oxides, is passed to separating means 15 by way of conduit 16. Separator 15, like separator 7, comprises a mechanical device such as a cyclone separator to remove solid particulate material from the gas stream. Solids recovered from separator 15 and comprising primarily regenerated sulfur acceptor material is passed via line 17 back to the first combustion zone.

A gas stream now containing most of the sulfur oxides produced in both zones 1 and 2, is passed from separator 15 to sulfur oxide removal unit 18 by way of conduit means 19. Unit 18 may comprise any conventional technique for removing and preferably recovering elemental sulfur, sulfur oxides or sulfuric acid from the gas stream. Illustrative techniques include wet scrubbing with water or other liquids such as glycols or amines and absorption of the sulfur oxides on solid absorbents. In some cases when burning high sulfur fuels, unit 18 may comprise a contact process sulfuric acid plant.

Concentration of sulfur oxides appearing in line 19 depends upon a variety of factors. Of primary importance is the sulfur content of fuels burned in the two combustion zones. Secondly, the ratio of fuel quantities burned in the two zones directly affects the concentration ratio of sulfur oxides in flue gas stream 19 as compared to stream 8. Lately, the efficiency of the sulfur acceptor introduced into zone 1 directly affects the residual concentration of sulfur oxides appearing in the flue gas from the zone.

If a chemically active limestone is used as the sulfur acceptor in zone 1, and if stoichiometric ratios of CaO to S are maintained above about 3, then more than 90 percent of the sulfur oxides produced by combustion in that zone can be absorbed by the acceptor and removed from the flue gas stream. Removals of 90 percent can be achieved if zone 1 is a fluidized bed combustor. If zone 1 is a pulverized coal combustor removals may be on the order of 50 percent. Relative size of the two combustion zones is preferably adjusted so that flue gas produced by zone 2 constitutes a minor fraction, preferably less than one-fourth, of the total flue gas stream from the two zones. Our work at this time indicates that sizing of the two combustion zones such that flue gas from zone 2 constitutes approximately 10 percent of the total gas stream produces very satisfactory and perhaps optimm overall process efficiencies. Thus, sulfur oxide content of stream 19 is enriched by a factor of about 10 and sulfur oxide content of stream 8 is depleted by a factor of about 10 as compared to an untreated flue gas stream. When burning coal having a sulfur content of about 5 percent, sulfur oxide levels in the flue gas from zone 1 can be held below about 0.05 percent while the sulfur oxide content in the flue gas from zone 2 will be on the order of 4 to 6 percent. In actual practice, we have achieved sulfur dioxide levels in excess of 8 percent in the flue gas from a fluidized bed boiler used in the manner described to decompose sulfated limestone acceptors.

When removing sulfur oxides from a waste gas by wet scrubbing techniques, it is usually necessary to cool the gas substantially below the normal stack temperatures of 250° to 300° F. Conventionally, gases are cooled to a temperature level of perhaps 90° to 170° F in order to maximize efficiency of the scrubbing solution and to minimize solvent loss if the sulfur oxide solvent used is something other than water. When the scrubbed gas is then released to the atmosphere, it is usually saturated in water vapor and produces a large and undesirable steam plume. Because of the loss in buoyancy of the scrubbed gas due to cooling, it tends to remain close to ground level and not disperse as does the hotter stack gas. In order to avoid these problems when using wet scrubbing techniques for sulfur oxide removal, we prefer to merge the sulfur oxide-depleted gas stream 20 from removal unit 18 with the hotter major flue gas stream 11 prior to entry into the stack. In this manner, little buoyancy loss of the merged flue gas streams is experienced and the combined gas stream can be efficiently dispersed by the stack.

Up to this point, the process illustrated in FIG. 1 has described use of our invention with a relatively finely divided particulate sulfur acceptor. It is also possible, and in some cases preferred, to use an acceptor having a much larger particle size. For example, if the device used to carry out the combustion in zone 1 is a fluidized bed combustor or similar device, then particulate sulfur acceptor material such as limestone may be used as the fluidized bed. In this variation of our process, little sulfated acceptor material is carried out of zone 1 in the existing flue gas stream. Rather, circulating means 21 are provided to transport sulfated bed material from zone 1 to zone 2 and return means 22 are provided to transport regenerated sulfur acceptor back to zone 1. Also in this embodiment, at least a major portion of solids 17 separated from the flue gas stream issuing from zone 2 are wasted via means 23 rather than recycled as previously described. In all other respects, the process remains substantially unchanged from that previously described.

Referring now to FIG. 2, there is shown a fluidized bed boiler module which may be used as combustion zone 2 or for both combustion zones 1 and 2 of FIG. 1. A bed of granular particles 30 is maintained in a fluidized suspension by the action of air or other gases from source 31, passing into plenum 32 and through air distributor and bed support means 33. Fuel, such as coal in particulate form, is introduced in pneumatic suspension through entry means 34 and is burned in fluidized suspension releasing head and products of combustion including various forms of sulfur. A particulate sulfur acceptor, such as limestone, delomite or other calcium and magnesium containing compounds is introduced into the bed through entry means 35. Flue gas, carrying fine particles 36 of fly ash, sulfated acceptor material and partially burned carbon particles exits from the module through breeching 37. Also provided are immersed heat exchange surface 38 and viewed heat exchange surface 39.

Operating temperature of the fluidized bed boiler is maintained at the chosen level by adjusting air and fuel rates; by raising or lowering the height of the fluidized bed; by changing the amount of immersed and viewed heat exchange surface provided; by changing the ratio of immersed to viewed heat exchange surface or by combinations of the above. Ratio of fuel to air is maintained relatively constant so as to maintain from about 0.5 to about 5 percent unreacted oxygen in the produts of combustion. Generally we prefer to control operating temperature of the boiler by adjusting the amount of immersed heat exchange surface provided.

The module illustrated can serve as the combustor for either zone 1 or zone 2 of the process of FIG. 1. When operated in a combustion-sulfur accepting mode, as in zone 1, temperature of the fluidized bed is maintained within a range of about 1,500° to 1,700° F. When operated in a combustion-decomposition mode less immersed heat exchange surface is provided and the bed temperature is maintained at a higher level; within the range of 1,700° to 2,200° F.

FIG. 3 shows a preferred embodiment of our invention in which both the first and second combustion zones comprise fluidized bed combustor modules of the type illustrated in FIG. 2. A plurality of modules 50 comprise the first combustion zone in which a sulfur containing fuel is burned in conjunction with a sulfur acceptor at temperature between about 1,500° to 1,700° F. Module 51 comprises the second combustion of decomposition zone in which temperatures above about 1,700° F are maintained.

Semi-isolated fluidized beds 52 comprising or containing a solid particulate sulfur acceptor are maintained within both the first and second combustion zones. The beds are supported upon air distribution grids 53. Air, which supplies oxygen for combustion and maintains the particulate beds 52 in a fluidized condition, is supplied by fan means 54 and is distributed among the beds by plenum chamber 55.

The semi-isolated condition of the fluidized beds is maintained by heat exchange wall members 56, 57, 58 and 59. Exterior wall members 56 and 59 comprise a conventional water wall while interior wall members 57 and 58 are in the form of tubes and connecting fins extending from steam drum 60 to headers 61. Details of members 57 and 58 are shown in FIG. 4. Additional viewed or radiant heat exchange surface 62 may be provided within each module above the fluidized bed.

In operation, a sulfur-containing fuel such as coal is introduced into the first combustion zone modules 50 by pneumatic injection through feed ports 63. A sulfur acceptor, preferably particulate limestone, may be introduced in admixture with the fuel. Gaseous products of combustion carrying fly ash and small particles of sulfated acceptor material are carried out of the first combustion zone via breeching means 64 and are passed to solid separation means 65 which may comprise a cyclone. Separated particulate matter consisting of ash, limestone derived matter and unburned solid combustible is passed from separator 65 to the second combustion zone module 5 by way of conveying means 66 and injection conduit 67. Module 51 is operated in the oxidizing mode and is maintained at a higher temperature than modules 50. Module 51 performs the function of the fly ash burn-up cell of U. S. Pat. No. 3,508,506 and also decomposes sulfated acceptor material releasing sulfur oxides and regenerating the acceptor.

It is preferred that a sulfur acceptor, such as a relatively attrition resistant limestone comprise the particulate material making up the fluidized bed. A size in the range of −8 +40 mesh will in most cases be satisfactory. Means are provided (shown in FIG. 4) to allow circulation of bed material from one module to another and from the first to the second combustion zones. When using coal as a feed, a size consist of about one-fourth inch × 0 is appropriate. This can result in a build-up of ash inventory within the fluidized beds. Means 78 are provided in decomposition module 51 to withdraw, either continously or intermittently, a portion of bed material. Withdrawn bed material may be disposed of as waste or a substantial portion may be reinjected into combustion zones 50 since it will contain a high concentration of regenerated acceptor material. When bed material is recycled, there is produced a positive flow of sulfated acceptor from the first to the second combustion zones and a resupply of regenerated sulfur acceptor to the first zone.

Auxiliary fuel from supply means 68 is metered into injection conduit 67 via conduit and feed means 69. An air stream 70 from any convenient source pneumatically transports fuel and particulate material through conduit 67 for injection into the fluidized bed of module 51. Gaseous products of combustion and decomposition, maintained separate from the combustion products of module 50, are passed bia breeching means 71 to solids separator 72. Particulate solids comprising fly ash and at least some finely divided regenerated acceptor material are removed from separator 72 by way of line 73. These solids may be discarded or, in those cases where large concentrations of regenerated acceptor are included, may be recycled back to modules 50.

A solids-depleted gas stream is passed from separator 72 to sulfur oxide removal means 74 by way of conduit 75. Means 74 may comprise any conventional technique of sulfur oxide removal and/or recovery. It is preferred that means 74 comprise a process and apparatus to recover either elemental sulfur or sulfuric acid from the sulfur oxides contained in the gas stream. For example, a sulfur oxide stripping and reaction technique such as that disclosed in U. S. Pat. No. 3,441,379 may be used to recover elemental sulfur while a conventional contact process plant may be used to produce sulfuric acid. Alternatively, means 74 may comprise a sulfur oxide extraction process which does not recover marketable forms of sulfur such as scrubbing with lime water.

Since the gas stream from zone 51 is of much less volume, typically comprising about 10 percent of the total flue gas stream, and is much higher in sulfur oxides, typically enriched by a factor of about 10, than is a conventional flue gas stream, recovery of sulfur or sulfuric acid can in some cases result in an economic profit. In those cases, it is preferred that the auxiliary fuel 68 used in module 51 have a high sulfur content. Such fuels are much less costly than are conventional fuels and produce higher concentration of sulfur oxides in the combustion gases. For example, pyritic coal washery refuse and sludges from the sulfuric acid treatment of hydrocarbons may be used to advantage as the auxiliary fuel in module 51.

In many cases, extraction of sulfur oxides from a waste gas stream requires substantial cooling; often to a temperature in the range of about 90° to 170° F. Cooling is usually accomplished by water-scrubbing which results in saturating the gas stream with water vapor. When such a cooled, saturated gas stream is released to the atmosphere, it tends to create a very large, low level steam plume. In order to overcome the lack of buoyancy inherent in a cool gas stream and to avoid creation of a steam plume, it is preferred to merge the sulfur oxide depleted gas stream 77 from treating means 74 with the larger volume, hotter gas stream 76 from separator 65 prior to passing the combined stream to a stack.

Referring now to FIG. 4, there is shown construction details of interior heat exchange walls which act to maintain the fluidized beds of the separate modules in a semi-isolated condition. The heat exchange walls are made up of a plurality of heat exchange tubes 80 terminating at their lower ends in a manifold or header 61. Air distribution grid 53 is supported at a level somewhat above header 61. Extending between heat exchange tubes 80 are fin members 81. In all cases, the lower edge of their fin members terminate at a level intermediate in the expanded height of the fluidized bed and at a level above gas distribution grid 53. This construction results in the provision of a number of ports or orifices 82 communicating between adjacent fluidized beds. In the case of interior heat exchange wells separating modules of the first combustion zone, fin members 81 terminate at their upper edge at a level approximating the height of the expanded fluidized bed within the module. Hence, in this instance, there is free communication of combustion gases above the fluidized beds between the various modules making up the first combustion zone.

The interior heat exchange wall separating the first and second combustion zones is similar in construction to that previously described except for one major difference. In this case, fin members 81 extend all the way to the top of the gas space above the fluidized beds thus preventing gas mixing with the combustion products of the first zone. This type of construction allows circulation of particulate bed material between modules and between combustion zones. In a preferred mode of operation, particulate sulfur acceptor material such as limestone is maintained as the major constituent of the fluidized bed. As sulfur is released by burning of fuel in the first combustion zone, it reacts with the acceptor material making up the bed. Lateral movement and migration of the bed material from the first to the second combustion zone results in the capture of sulfur in the first zone and release of sulfur in the second zone. An auxiliary means to provide additional circulation between the two zones may also be provided as has been previously described.

As may now be appreciated, we have provided a simple but effective technique and apparatus for concentrating a major portion of sulfur compounds within a minor portion of flue gas. While we prefer to use limestone as the sulfur accepting material, other calcium or magnesium oxide-containing natural materials or waste products may be utilized as is well recognized in the art of sulfur removal. Although this disclosure is oriented primarily toward the generation of steam using coal as a fuel, the usefulness of our invention is much broader. For example, our invention may be used for the incineration of many oil refinery and chemical plant wastes which contain sulfur with the concomitant generation of stream or other vapor.

What is claimed is:

1. Combustion apparatus for the burning of sulfur containing fuels and the extraction of heat energy therefrom which comprises:
    a first fluidized bed boiler having heat exchange surfaces disposed within the fluidized bed;
    a second fluidized bed boiler positioned adjacent said first boiler and having less heat exchange surface disposed within the fluidized bed than said first boiler;
    means to provide circulation of particulate material making up the fluidized beds between said first and said second fluidized bed boilers, and
    means to prevent mixing of gaseous combustion products produced in said first boiler with combustion products produced in said second boiler.

2. The apparatus of claim 1 wherein said second fluidized bed boiler is positioned continguous to said first fluidized bed boiler.

3. The apparatus of claim 2 wherein said means to prevent mixing of gaseous combustion products produced in the two boilers comprises a heat exchange wall member extending from a point below the top level of the fluidized beds continuously to the top of said boilers.

4. The apparatus of claim 3 wherein said means to provide circulation of particulate material making up the fluidized beds between said first and second boilers comprise ports in said heat exchange wall member at a location below the top of the fluidized beds.

5. The apparatus of claim 4, wherein said ports are at a level in the lower half of the fluidized beds.

* * * * *

UNITED STATES PATENT OFFICE
CERTIFICATE OF CORRECTION

Patent No. 3,763,830　　　　Dated October 9, 1973

Inventor(s) Ernest B. Robison, Shelton Ehrlich, mJohn W. Bishop

It is certified that error appears in the above-identified patent and that said Letters Patent are hereby corrected as shown below:

Item [75] : "Ernest B. Robinson" should read

-- Ernest B. Robison --.

Signed and sealed this 1st day of October 1974.

(SEAL)
Attest:

McCOY M. GIBSON JR.　　　　C. MARSHALL DANN
Attesting Officer　　　　Commissioner of Patents